United States Patent
Obata

(10) Patent No.: US 7,640,297 B2
(45) Date of Patent: Dec. 29, 2009

(54) PROTOCOL OPTIMIZATION FOR WIRELESS NETWORKS

(75) Inventor: Hitoshi Obata, Edogawa-ku (JP)

(73) Assignee: Gemini Mobile Technologies, Inc., San Mateo, CA (US)

(*) Notice: Subject to any disclaimer, the term of this patent is extended or adjusted under 35 U.S.C. 154(b) by 624 days.

(21) Appl. No.: 11/182,960

(22) Filed: Jul. 14, 2005

(65) Prior Publication Data

US 2007/0014292 A1    Jan. 18, 2007

(51) Int. Cl.
G06F 15/16   (2006.01)
H04L 12/28   (2006.01)
H04L 12/56   (2006.01)
G06F 15/173  (2006.01)

(52) U.S. Cl. .................. 709/203; 370/389; 370/392; 370/401; 709/227; 709/228; 709/231; 709/239

(58) Field of Classification Search ......... 709/227–244; 370/392

See application file for complete search history.

(56) References Cited

U.S. PATENT DOCUMENTS

| | | | |
|---|---|---|---|
| 5,695,400 A | 12/1997 | Fennell, Jr. et al. | |
| 5,738,583 A | 4/1998 | Comas et al. | |
| 5,903,618 A * | 5/1999 | Miyake et al. | 375/356 |
| 5,970,125 A * | 10/1999 | Smith et al. | 379/93.25 |
| 6,009,458 A * | 12/1999 | Hawkins et al. | 709/203 |
| 6,029,046 A * | 2/2000 | Khan et al. | 725/31 |
| 6,152,824 A | 11/2000 | Rothschild et al. | |
| 6,453,160 B1 | 9/2002 | Thomas et al. | |
| 6,475,090 B2 | 11/2002 | Roelofs | |
| 6,508,710 B1 | 1/2003 | Paravia et al. | |
| 6,524,189 B1 | 2/2003 | Rautila | |
| 6,640,284 B1 | 10/2003 | Shaw et al. | |
| 6,659,861 B1 | 12/2003 | Faris et al. | |
| 6,699,125 B2 | 3/2004 | Kirmse et al. | |
| 6,810,528 B1 | 10/2004 | Chatani | |
| 6,845,389 B1 | 1/2005 | Sen et al. | |
| 6,863,612 B2 | 3/2005 | Wills | |
| 6,874,029 B2 * | 3/2005 | Hutcheson et al. | 709/227 |
| 6,893,347 B1 | 5/2005 | Zilliacus et al. | |
| 6,908,389 B1 | 6/2005 | Puskala | |
| 6,935,959 B2 | 8/2005 | Danieli et al. | |
| 6,942,575 B2 | 9/2005 | Mergler | |

(Continued)

FOREIGN PATENT DOCUMENTS

WO   WO 2005/061067   7/2005

*Primary Examiner*—Daniel J Ryman
*Assistant Examiner*—Andrew Oh
(74) *Attorney, Agent, or Firm*—Crowell & Moring LLP

(57) ABSTRACT

A system for improving the performance of on-demand mobile communications services includes a wireless network having a plurality of mobile devices and an application server. A relay node receives data from a first mobile device, the data having a destination address associated with the application server. The relay node is adapted to detect a service flag in the received data and route the received data to a second mobile device in accordance with stored routing rules. The received data may be transmitted using the UDP protocol, including error correction code for important data to guarantee packet delivery. A client device may be further adapted to track the duration of idle communications periods during operation of a client application, and transmit a dummy packet to the gaming server when the duration exceed a predetermined threshold to prevent the relinquishment of allocated system resources.

27 Claims, 6 Drawing Sheets

U.S. PATENT DOCUMENTS

| | | |
|---|---|---|
| 6,947,761 B2 | 9/2005 | Hutcheson et al. |
| 6,999,083 B2 | 2/2006 | Wong et al. |
| 7,016,942 B1 | 3/2006 | Odom |
| 7,069,000 B1 | 6/2006 | Corson et al. |
| 7,092,946 B2 | 8/2006 | Bodnar |
| 7,097,562 B2 | 8/2006 | Gagner |
| 7,127,069 B2 | 10/2006 | Nguyen |
| 7,376,137 B2 * | 5/2008 | Sung et al. ............ 370/401 |
| 2001/0013050 A1 * | 8/2001 | Shah ................. 709/202 |
| 2002/0128984 A1 * | 9/2002 | Mehta et al. ........... 705/71 |
| 2003/0056112 A1 * | 3/2003 | Vinson et al. ......... 713/200 |
| 2003/0177187 A1 * | 9/2003 | Levine et al. ......... 709/205 |
| 2003/0190888 A1 * | 10/2003 | Mangal et al. ........ 455/3.05 |
| 2003/0210694 A1 * | 11/2003 | Jayaraman et al. ...... 370/392 |
| 2004/0109447 A1 * | 6/2004 | Douglass et al. ........ 370/389 |
| 2004/0136386 A1 * | 7/2004 | Miller et al. ............ 370/401 |
| 2004/0153557 A1 * | 8/2004 | Shochet et al. .......... 709/229 |
| 2004/0192442 A1 * | 9/2004 | Wells et al. ............. 463/36 |
| 2004/0208153 A1 * | 10/2004 | Mizell et al. ............ 370/338 |
| 2004/0224710 A1 * | 11/2004 | Koskelainen et al. ..... 455/518 |
| 2004/0246975 A1 * | 12/2004 | Joshi ................ 370/395.31 |
| 2005/0071481 A1 * | 3/2005 | Danieli ................ 709/229 |
| 2005/0169235 A1 * | 8/2005 | Hutcheson et al. ........ 370/350 |
| 2005/0193123 A9 * | 9/2005 | Bach Corneliussen ...... 709/228 |
| 2005/0239456 A1 * | 10/2005 | Sung et al. ............. 455/427 |
| 2006/0247053 A1 * | 11/2006 | Mattila ................ 463/42 |

* cited by examiner

PROTOCOL OPTIMIZATION FOR WIRELESS NETWORKS

FIELD OF THE INVENTION

The present invention relates generally to wireless communications systems, and more particularly to systems and methods for optimizing a wireless network for on-demand communications.

BACKGROUND OF THE INVENTION

Online gaming systems allow remote users, connected to a communications network such as the Internet, to play computer games against each other. Users typically connect to an online gaming server from a client device, such as a personal computer. The client device processes the graphics and sounds for the game and provides the player with the interactive gaming experience. The speed and responsiveness of an online game is typically limited by the communication latency between the client devices and the gaming server. Each client device periodically transmits data messages to the game server regarding the respective player's movements and actions in the game. The gaming server tracks each player through the received data and transmits the data to the other client devices to synchronize the game play.

Wireless environments are typically associated with higher communications latencies than fixed networks that further restrict the online gaming experience. For example, most wireless communications systems were designed and built to provide mobile devices with cost-effective telephone services. The high latencies acceptable in conventional telephone services are not acceptable for applications that require on-demand communications, such as online gaming. In addition, mobile devices are further restricted by less processing power and display capabilities than personal computers.

Wireless communications latencies also restrict other on-demand communications applications such as Push-to-Talk communications. Thus, there is a need for an improved system and method for operating a wireless network to facilitate online gaming and other on-demand services.

SUMMARY OF THE INVENTION

The present invention is directed to systems and methods for improving the performance of on-demand mobile communications services. In one embodiment, a wireless network includes a plurality of mobile devices, a relay node and an application server. A relay node receives data from a first mobile device, the data having a destination address associated with the application server. The relay node is adapted to detect a service flag in the received data and route the received data to a second mobile device in accordance with stored routing rules. The received data may be transmitted using the User Datagram Protocol (UDP), including an error correction code for important data to guarantee packet delivery. A client device may be further adapted to track the duration of idle communications periods during operation of a client application, and to transmit a dummy packet to the gaming server when the duration exceeds a predetermined threshold to prevent the relinquishment of allocated system resources.

DETAILED DESCRIPTION

The present invention is directed to systems and methods for improving the performance of on-demand mobile communications services.

Figure 1:
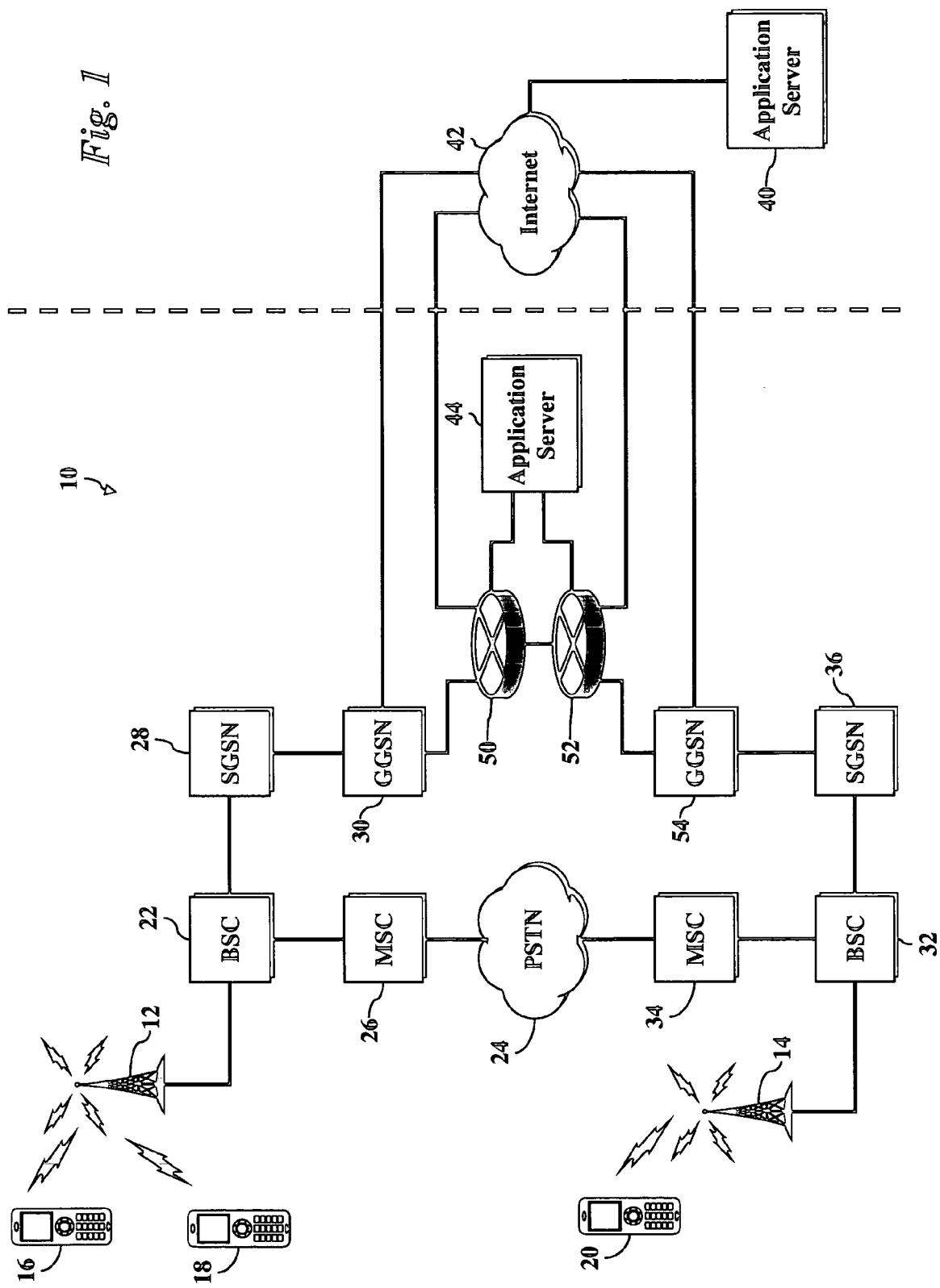
FIG. 1 illustrates a mobile network in accordance with an embodiment of the present invention.

A first embodiment of the present invention will be described with reference to FIG. 1. A mobile network 10 includes a plurality of base stations 12 and 14 providing wireless communications services to a plurality of mobile devices 16 and 18, and 20, respectively. The mobile network 10 is a Global System for Mobile Communications (GSM) network, but it will be appreciated that the present invention will support other wireless communications systems and protocols such as TDMA, CDMA and WCDMA networks. The mobile devices 16, 18 and 20 may be any devices that are adapted to communicate with the base stations 12 and 14 such as mobile phones, personal digital assistants (PDAs) or handheld computers.

The base station 12 is connected to a base station controller 22 which routes interconnect communications to a Public Switched Telephone Network (PSTN) 24 through a Mobile Switching Center (MSC) 26. Packet data communications are routed from the base station 12 to a Serving GPRS Support Node (SGSN) 28 which connects the mobile network 10 to a Gateway GPRS Support Node (GGSN) 30. The base station 14 is connected to a base station controller 32 which routes interconnect communications to PSTN 24 through an MSC 34, and packet data communications to an SGSN 36 which is connected to a GGSN 54.

The mobile devices 16, 18 and 20 are adapted for online game play through an application server 40, which may be accessed through the Internet 42. In a conventional configuration, for example, mobile device 16 may access the application server 40 through the Internet 42 to download a client version of a game, set up a game environment and engage in online game play with one or more of the mobile devices 18 and 20, or other client devices. During game play, each of the mobile devices communicates with the application server 40 through the Internet 42 to share game status information such as character position and other data to synchronize game play. The application server 40 processes the received information and transmits game synchronization information to each of the participating mobile devices.

To facilitate more responsive multiplayer game play and faster data transfer, the mobile network 10 of the present embodiment includes at least one relay node 50 and an application server 44. The relay node 50 is a router connected to the GGSN 30 that provides a data communications link between the mobile devices 16 and 18 and the application server 44, and facilitates peer-to-peer routing between the mobile devices 16, 18 and 20. The relay node 50 may also be adapted to route data communications between a mobile device and another network, such as between mobile device 16 and the Internet 42.

In operation, the relay node 50 screens gaming data packets from the SGSN 28 and facilitates peer-to-peer routing of gaming information that does not require processing by the application server 44. For example, the relay node 50 may receive data packets from mobile device 16 and, bypassing the application server 44, route the data packets to mobile device 18, to a second relay router 52 for forwarding to the mobile device 20, or to a plurality of destinations as dictated by the stored routing rules. A copy of the data packets may also be forwarded to the application server 44 as required. If processing by the application server 44 is required, the relay router 50 transmits the data packets to the application server 44. The application server 44 processes the received data and transmits updated gaming data to mobile devices 16, 18 and 20 through the relay nodes 50 and 52.

It will be appreciated by those skilled in the art that the relay node 50 may connect to any application server providing services to the mobile devices including game servers and Push-to-Talk (PTT) servers. In a PTT application, after the PTT session is set up between two mobile devices, communications can proceed peer to peer through the relay nodes, bypassing the application server and providing more instantaneous communication.

Figure 2:
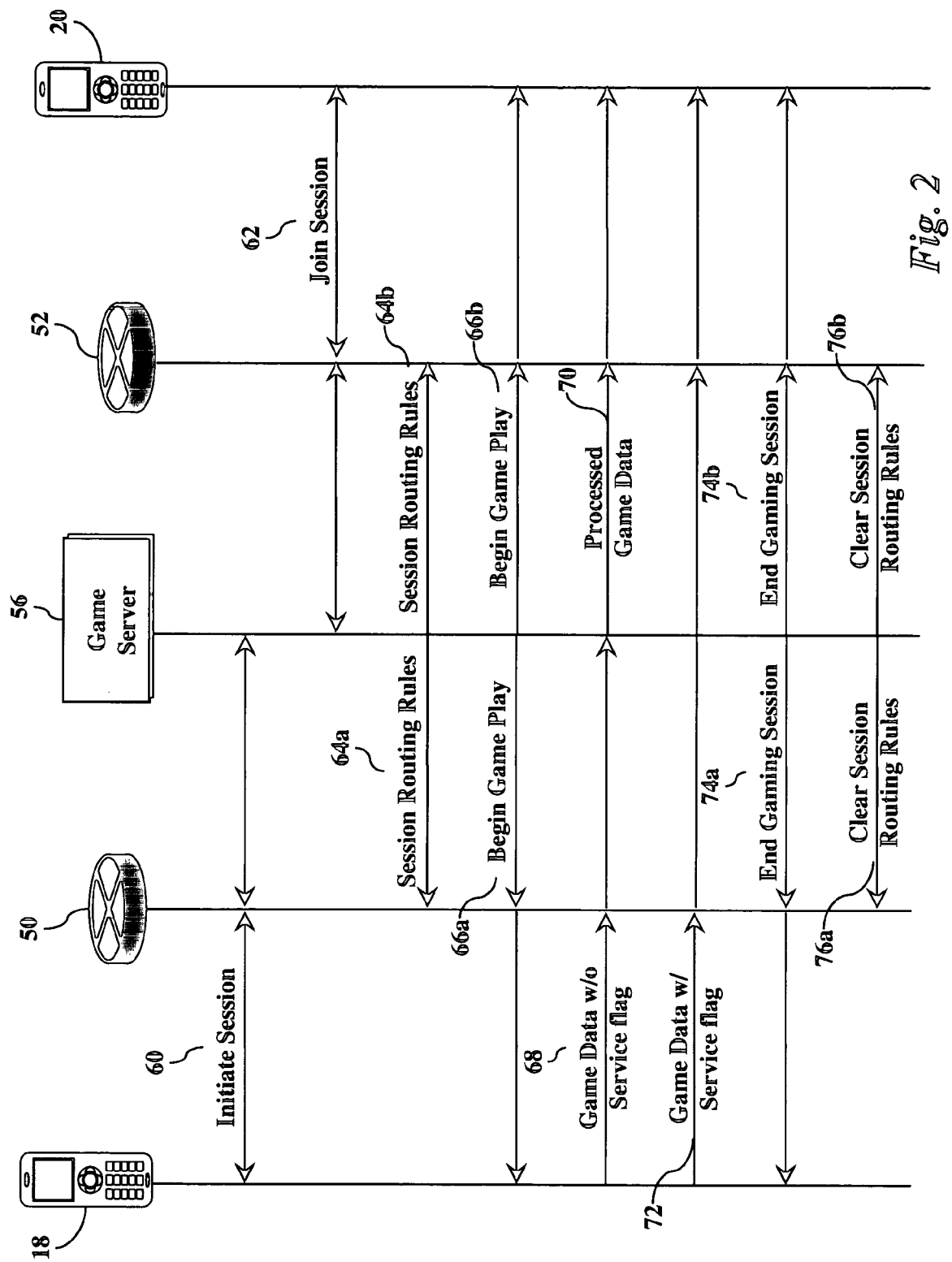
FIG. 2 illustrates an embodiment of a data flow of the mobile network of FIG. 1.

Referring to FIG. 2, an embodiment of an operation of a gaming application will be described. In this embodiment, mobile device 18 and mobile device 20 participate in an online game through a game server 56. The user of mobile device 18 accesses the game server 56 through a gaming application on the mobile device 18 and initiates a gaming session. The communication 60 between the mobile device 18 and game server 56 is routed through the relay node 50. The mobile device 20 also accesses the game server 56 through a gaming application on the mobile device 20 and joins in the gaming session. The communication 62 between the mobile device 20 and the game server 56 is routed through the relay node 52.

The game server 56 passes session routing rules 64a and 64b to the relay nodes 50 and 52, respectively, that are servicing the mobile devices. Systems and protocols for updating stored routing rules in a router are known in the art and may be used in accordance with various embodiments of the present invention. Game play begins after gaming data 66a and 66b is routed to each mobile device. During game play, the mobile devices will need to provide synchronization data to the each other and the gaming server. Game data 68 is transmitted from the mobile device 18 to the game server 56. The game data 68 is received at the relay node 50, which determines that a service flag has not been set, and routes the game data to the game server 56 in accordance session routing rules 64a. The game server 56 processes the data as needed and forwards the processed data 70 to the mobile device 20. The processed data is routed to relay node 52, which forwards the message to the mobile device 20.

For messages that do not require processing by the game server 56, the mobile device 18 sets a service flag in the header of the game data 72. When the mobile device 18 transmits the game data 72 to the game server 56, the relay node 50 applies the routing rules 64a to bypass the gaming server 56. The appropriate routing rules may be identified based on a session id, a source id, a destination id and/or other identifiers. In one embodiment the relay node 50 identifies the mobile device 18 as the source, the game server 56 as the destination and the service flag that is set, and applies the rules 64a to route the game data 72 to the mobile device 20 through the relay node 52. After the session terminates (see communications 74a and 74b) the game server 56 removes the session rules 64a and 64b from the relay nodes 50 and 52 in communications 76a and 76b.

Figure 3:
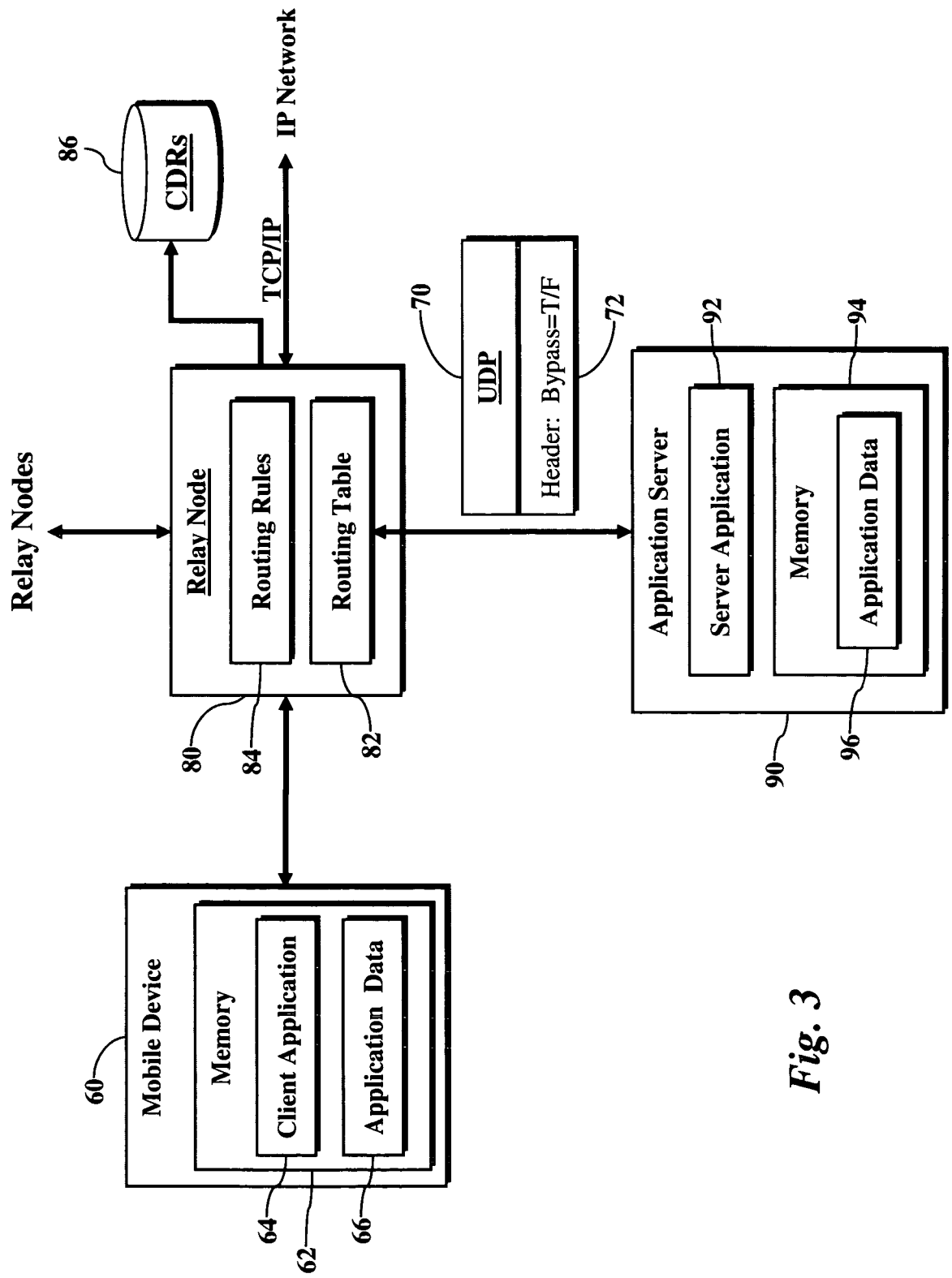
FIG. 3 illustrates a mobile network in accordance with an embodiment of the present invention.

Referring to FIG. 3, another embodiment of an operation of a relay node will be described. A mobile device 60 includes a memory 62 including a client application 64 and application data 66. The client application 64 may be included in the device firmware, downloaded from an application server, or acquired by other methods. The client application 64 is adapted to transmit data messages to an application server 90 using the UDP protocol 70, including a service flag 72 in the header 72. The client application 64 may use other protocols for communications with other servers in the environment. In alternate embodiments, other protocols such as TCP/IP may be used for communications between the mobile device 60 and the application server 90.

A relay node 80 is configured to route application data packets to other relay nodes, to the application server 90 or to the Internet or other IP network. Routing may be based on protocol, such as TCP/IP or UDP, may be based on destination IP address of the application server 90, or other routing techniques. The relay node 80 includes a routing table 82 identifying other network elements and routing rules 84, including rules configurable by the application server 90. In one embodiment, the relay node 80 produces call detail records (CDRs) 86 to facilitate billing for use of the relay node 80 and/or application server 90. The application server 90 includes a server application 92 and a memory 94 storing application data 96.

Another embodiment of the present invention will now be described with reference to FIGS. 4-7. In conventional gaming applications, data is transmitted between the gaming server and client using Transmission Control Protocol (TCP). Because TCP guarantees that all data is received, lost packets or delayed packets can slow down the data transmission rate and impede game play.

In the present embodiment, an express relay protocol is defined between the client and the application server using UDP. The use of UDP facilitates a low latency data communication environment for online game applications. UDP is commonly used for real time communications in stable communications environments such as streaming media on a fixed network. In streaming media applications, lost data packets are not critical and may be discarded.

Figure 5:
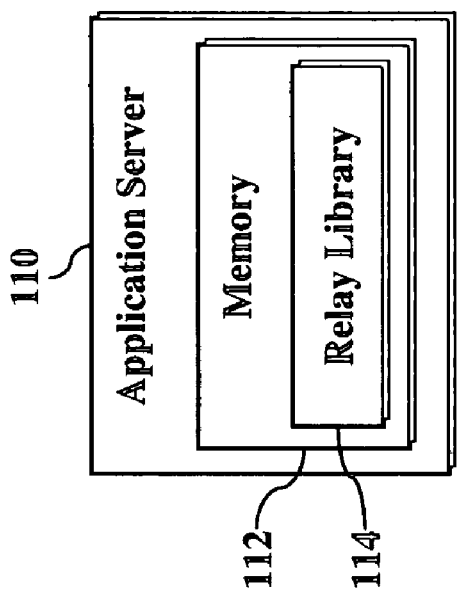
FIG. 5 illustrates an application server in accordance with an embodiment of the present invention.
Figure 4:
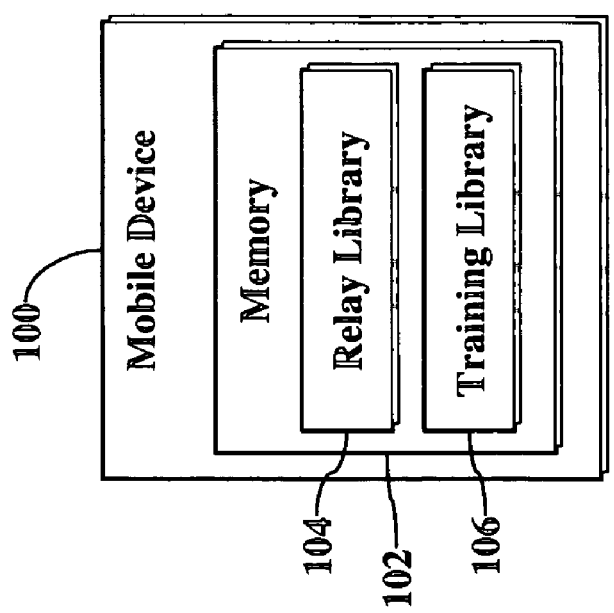
FIG. 4 illustrates a mobile device in accordance with an embodiment of the present invention.

Wireless environments are not as stable as fixed networks and certain data in non-streaming applications may be critical and cannot be discarded. In accordance with the present embodiment, the UDP protocol is modified to include a service flag, error correction and authentication. As illustrated in FIG. 4, a mobile device 100 includes a memory 102 that includes a client relay library 104 supporting UDP packet communication with an application server. The mobile device 100 also includes a training library 106 for measuring the performance of the network to determine an appropriate mode for the relay library 104 to be applied to communications. As illustrated in FIG. 5, an application server 110 includes a memory 112 storing a relay library 114 for facilitating relay communications such as support for UDP packet communications with the mobile device 100 via a relay node.

In one embodiment, the client and server relay libraries support three types of information transfer between the mobile device and the application server: regular information, important information and TCP. Regular information is sent via UDP without error correction. This type of information is not critical and will be repeated often in the data stream, so some lost data packets may be tolerated. For example, information regarding a player's position, movements and actions are transmitted throughout game play, and a small number of dropped packets will not have a major impact on the overall gaming experience. Important information is sent via UDP with error correction, such as data interleaving to prevent lost data due to signal interruptions. Using interleaving causes some additional latency in the data rate as compared to regular information transfer. Other data, including data sent outside of a gaming environment, is transmitted using TCP.

Figure 7:
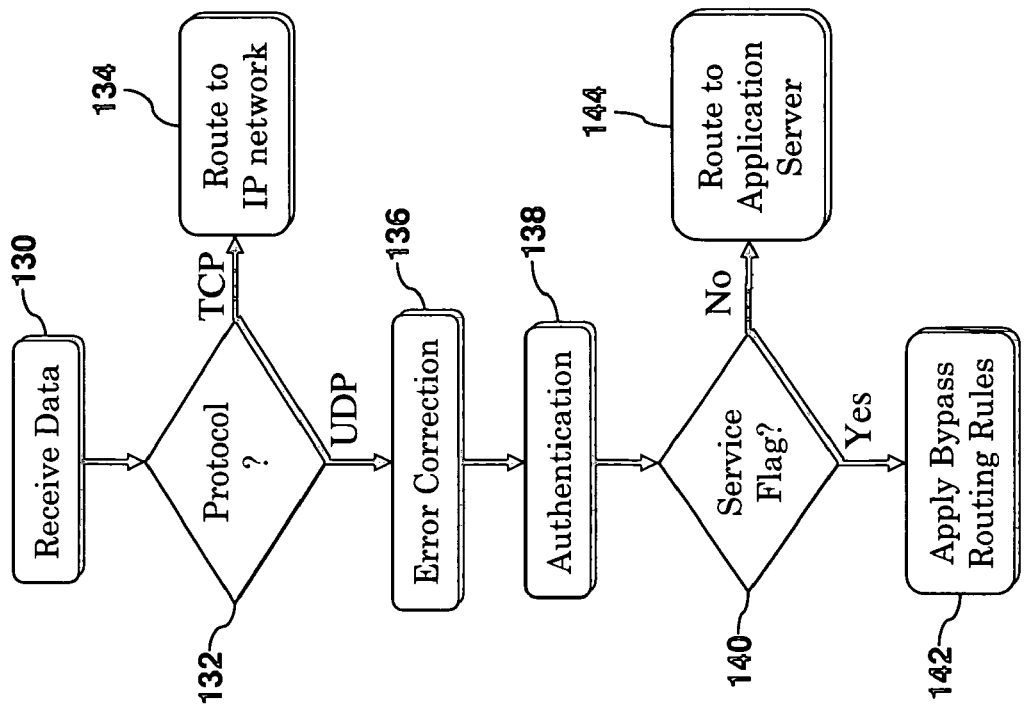
FIG. 7 is a flow diagram illustrating an embodiment of an operation of the relay node of FIG. 6.
Figure 6:
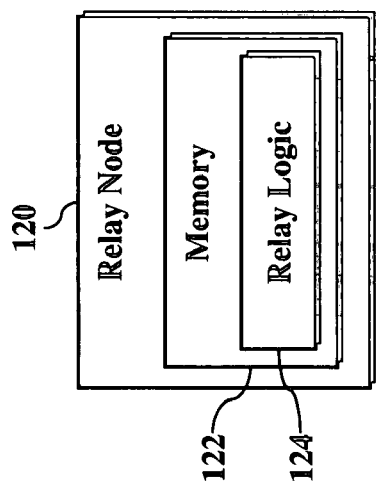
FIG. 6 illustrates a relay node in accordance with an embodiment of the present invention.

The operation of a relay node 120 will now be described with reference to FIGS. 6 and 7. The relay node 120 includes a memory 122 storing relay logic 124 for handling and routing incoming packets. The relay node 120 supports secure transmission of UDP packets in a low latency communication environment between a mobile device and application server. An embodiment of the relay logic 124 is illustrated in FIG. 7. In step 130, the relay node receives incoming data. In step 132 the protocol is determined and the data is forwarded to an IP network in step 134 if TCP data was received. If UDP data was received, then in step 136 the relay node performs error correction if used on the incoming data. In step 138, the relay node authenticates the incoming data using a relay key in embodiments where authentication is required. The relay key may be periodically updated via an authentication server to provide secure communications through the relay node 120. In step 140 the relay node detects the service flag and, if it is set, applies the routing rules in step 142 to forward the data to another mobile device, bypassing the application server. If the service flag is not set, the relay node forwards the data to the application server in step 144.

Figure 8:
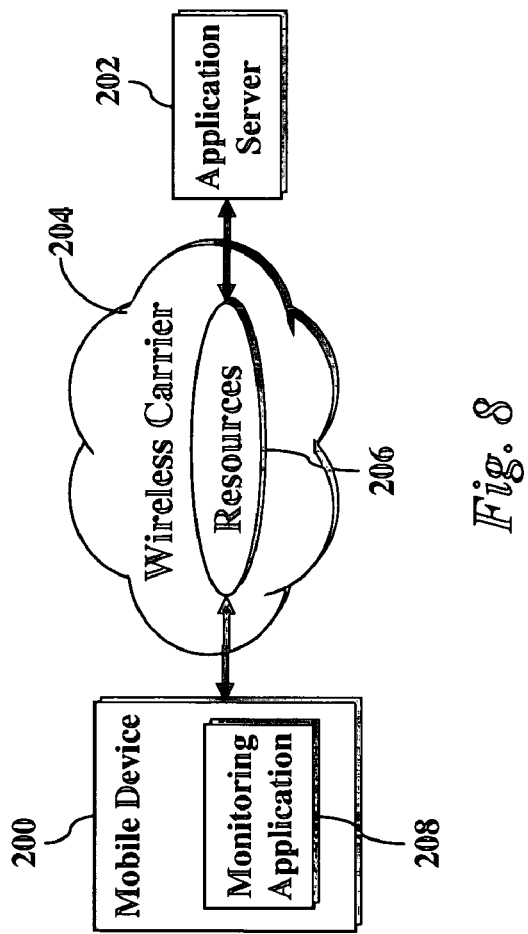
FIG. 8 is wireless network in accordance with an embodiment of the present invention.

A third embodiment will now be described with reference to FIGS. 8 and 9. Referring to FIG. 8, when a mobile device 200 establishes communications with an application server 202 through a wireless carrier 204, the wireless carrier 204 allocates network resources 206 for the communication, establishing a communications path. The mobile device 200 relinquishes the allocated resources 206 when the communications session terminates or after a certain period of inactivity. After resources are relinquished, the next communication between the mobile device 200 and the application server 202 will be delayed while the resources 206 are reallocated. In many networks, the delay may be between 3-6 seconds for the retrieval of the new resources and a return to an active communications state. A 3-6 second delay is unacceptable for many on-demand communications applications, such as online gaming and push-to-talk communications.

In accordance with the present embodiment, the mobile device 200 includes a software monitoring application 208 for measuring the idle time between communications. If the idle time exceeds a predetermined threshold while the mobile device 200 is engaged in online gaming, PTT communications or other realtime application, then the mobile device 200 will transmit a dummy packet to the application server 202. Passing the dummy packet through the wireless carrier 204 will reserve the resources 206 and initiate a new idle period. The monitoring application 208 may be part of the system software or libraries of the mobile device 200.

Figure 9:
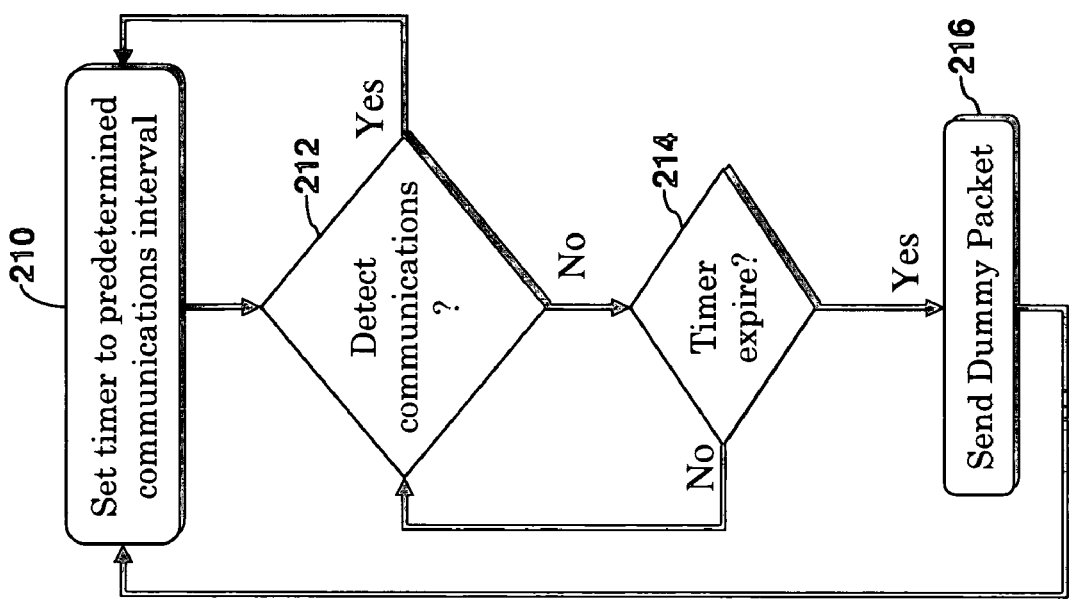
FIG. 9 is a flow diagram illustrating an embodiment of an operation of the monitoring application of FIG. 8.

An embodiment of the operation of the monitoring application 208 is illustrated in FIG. 9. In step 210, a timer is set to a predetermined communications interval. The predetermined communications interval may be set at maximum idle period that the network will tolerate before releasing allocated resources. This interval will vary between wireless networks. In certain 3G GPRS networks, it has been found that the network will enter an idle state and release the network resources where there is no data transmission for 70 to 80 seconds. In one embodiment, the mobile device 200 tests the network to determine an appropriate communications interval. The network may be tested by measuring the latency of a first packet transmission, maintaining an idle state for an interval, and then measuring the latency of a second packet transmission. This is repeated with incrementally longer intervals while the latency period remains relatively stable. Eventually, the length of the idle period will cause the network to drop the allocated resources and allocate new resources for the mobile device 200 in order to deliver the dummy packet. This will cause a spike in the latency measurement indicating that the previously tested interval may be appropriate for use in step 210.

In step 212, if the monitoring application 208 detects a wireless communications event on the mobile device, then the timer is reset in step 210. After the timer expires in step 214, a dummy packet is sent in step 216. The timer is then reset in step 210.

Figure 10:
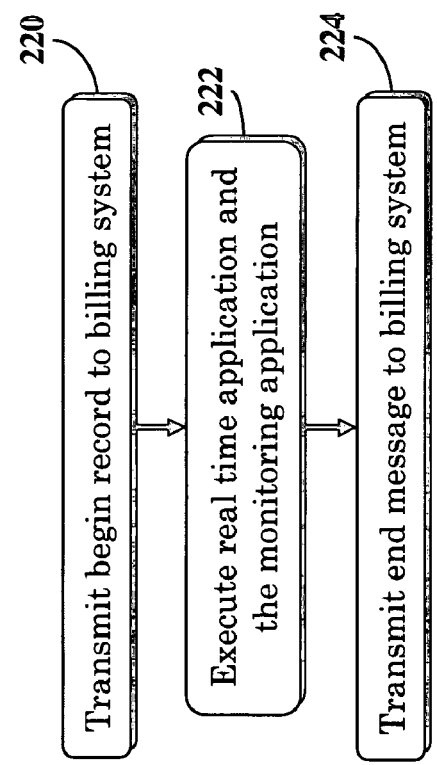
FIG. 10 is a flow diagram illustrating a billing method in accordance with an embodiment of the present invention.

Because there are limited resources on a wireless network, the wireless carrier 204 may charge a premium for tying up the resources through the monitoring application 208. Referring to FIG. 10, in step 220 when an application requiring realtime communications is launched with the monitoring application, a billing notification record is transmitted to the wireless carrier's billing system. In step 222, the realtime application is executed while the monitoring application maintains system resources by periodically transmitting dummy packets across the network. When the use of the monitoring application terminates, in step 224 a second billing notification record is transmitted to the billing system to mark the end of the premium realtime service.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. In a wireless network including a plurality of mobile devices a relay node and a gaming server, a method for online gaming comprising:

receiving, by the relay node, gaming data from a first mobile device, the gaming data having a destination address associated with the gaming server;

detecting, by the relay node, a service flag in the received gaming data prior to the gaming data being processed by the gaming server, wherein the service flag is set by the first mobile device;

routing, by the relay node, the received gaming data to a second mobile device, bypassing the gaming server corresponding to the destination address in the gaming data, in accordance with stored routing rules if the service flag is set; and routing, by the relay node, the received gaming data to the gaming server in accordance with the destination address if the service flag is not set.

2. The method of claim 1 wherein the step of routing further comprises routing the received gaming data to a third mobile device.

3. The method of claim 1 wherein the step of routing, by the relay node, the received gaming data to the second mobile device further comprises routing, by the relay node, the received gaming data to a second relay node servicing the second mobile device.

4. The method of claim 1 wherein the received gaming data has a UDP format.

5. The method of claim 1 further comprising receiving, by the relay node, the routing rules from the gaming server.

6. The method of claim 1, wherein the service flag is set when the gaming data does not require processing by the gaming server.

7. The method of claim 1, further comprising routing gaming data to each of the gaming server and to the second mobile device during a single gaming session based on the detected service flag.

8. The method of claim 1, wherein the gaming data does not include a client destination address associated with the second mobile device.

9. The method of claim 1, wherein the first mobile device comprises a relay library including program instructions stored within a memory of the first mobile device which, when executed by a processor of the first mobile device, cause the first mobile device to:
 determine whether the gaming data is of a type that requires processing by the gaming server, or is of a type that may be routed to at least the second mobile device without being processed by the gaming server; and
 set the service flag if gaming data is of the that type that may be routed to at least the second mobile device without being processed by the gaming server.

10. A wireless client device for use in a multiplayer online wireless gaming system, the wireless client device comprising:
 a client application stored in a memory of the client device and adapted to generate gaming data during a gaming session, wherein the gaming data includes a destination address associated with a gaming server; and
 a relay library including program instructions stored in the memory which, when executed by a processor of the client device, cause the client device to:
 determine whether the generated gaming data is of a type that requires processing by the gaming server, or is of a type that may be routed to a destination client device without being processed by the gaming server; and
 transmit the gaming data to the gaming server, wherein the gaming data includes a header having a service flag that is set only if the gaming data does not require processing by the gaming server, wherein the service flag is set by the client device.

11. The client device of claim 10 wherein the transmitted gaming data includes an error correction code.

12. The client device of claim 11 wherein the error correction code includes interleaved data.

13. The client device of claim 10 wherein the memory further includes a monitoring application including program instructions for causing the client device to:
 track the duration of idle communications periods during the operation of the client application; and
 transmit a dummy packet to the gaming server when the duration exceeds a predetermined threshold.

14. The client device of claim 13 wherein the monitoring application further includes program instructions for causing the client device to transmit a first billing notification to a billing server when the monitoring application is launched.

15. The client device of claim 14 wherein the monitoring application further includes program instructions for causing the client device to transmit a second billing notification to the billing server when the monitoring application is terminated.

16. The wireless client of claim 10, wherein the gaming data is to bypass the gaming server and be routed to a second wireless client device without regard to the destination address when the service flag is set.

17. In a wireless network including a plurality of mobile devices and an application server connected through a data network, a relay node comprising:
 an interface to the data network;
 a memory storing routing rules; and
 a program memory including program instructions stored in a computer-readable storage medium which, when executed by a processor, cause the relay node to:
 detect a service flag in received gaming data from the wireless network, the gaming data including a source address of a first mobile device and a destination address of the application server prior to the gaming data being processed by the application server, wherein the service flag in the received gaming data is set by the first mobile device,
 route the received gaming data to a second mobile device in accordance with the stored routing rules if the service flag is set, and
 route the received gaming data to the application server in accordance with the destination address if the service flag is not set.

18. The relay node of claim 17 wherein the received gaming data is also routed to a third mobile device in accordance with the stored routing rules if the service flag is set.

19. The relay node of claim 17 wherein the received gaming data is routed to a second relay node servicing the second mobile device.

20. The relay node of claim 17 wherein the interface includes functionality for handling UDP data.

21. The relay node of claim 17 wherein the stored routing rules are received from the application server.

22. The relay node of claim 17 wherein the program memory further includes program instructions for causing the relay node to route the received gaming data to the application server if the service flag is not set.

23. The relay node of claim 17 wherein the application server is a PTT server and the received gaming data includes PTT communications data.

24. The relay node of claim 17 wherein the program memory further includes program instructions for causing the relay node to generate and store a call detail record for the received gaming data.

25. The relay node of claim 17, wherein the service flag is set when the gaming data does not require processing by the application server.

26. The relay node of claim 17, wherein the program memory further includes program instructions for causing the relay node to route gaming data to each of the application server and to the second mobile device during a single gaming session based on the detected service flag.

27. The relay node of claim 17, wherein the first mobile device comprises a relay library including program instructions stored within a memory of the first mobile device which, when executed by a processor of the first mobile device, cause the first mobile device to:
 determine whether the gaming data is of a type that requires processing by the application server, or is of a type that may be routed to at least the second mobile device without being processed by the application server; and
 set the service flag if gaming data is of the that type that may be routed to at least the second mobile device without being processed by the application server.

* * * * *

UNITED STATES PATENT AND TRADEMARK OFFICE
CERTIFICATE OF CORRECTION

PATENT NO. : 7,640,297 B2
APPLICATION NO. : 11/182960
DATED : December 29, 2009
INVENTOR(S) : Hitoshi Obata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Twenty-first Day of December, 2010

David J. Kappos
*Director of the United States Patent and Trademark Office*